United States Patent

Clark

[15] 3,656,379
[45] Apr. 18, 1972

[54] METHODS OF CUTTING LAMINATED STRIP MATERIAL

[72] Inventor: Martin Ronald Newton Clark, Ickenham, England

[73] Assignee: Vandervell Products Limited, London, England

[22] Filed: July 20, 1970

[21] Appl. No.: 56,286

[30] Foreign Application Priority Data

Oct. 22, 1969 Great Britain..................51,835/69

[52] U.S. Cl..................................83/5, 83/9, 83/39, 83/519, 83/675, 83/686
[51] Int. Cl. .........................B26d 3/06, B26d 9/00
[58] Field of Search...........................83/5, 6, 9, 39, 519, 686

[56] References Cited

UNITED STATES PATENTS 3,517,576  6/1970  Hilty et al....................83/5
3,604,295  9/1971  Clark et al...................83/9

Primary Examiner—Frank T. Yost
Attorney—Mawhinney & Mawhinney

[57] ABSTRACT

A method of cutting a laminated strip of material having soft and hard layers in which a groove is cut in the soft layer up to the hard layer and the hard layer is cut through in a plane between the sidewalls of the groove. The width of the groove is sufficient to avoid distortion of the hard layer caused by cutting of the hard layer from reaching the interfaces between the soft and hard layers on either side of the groove.

5 Claims, 7 Drawing Figures

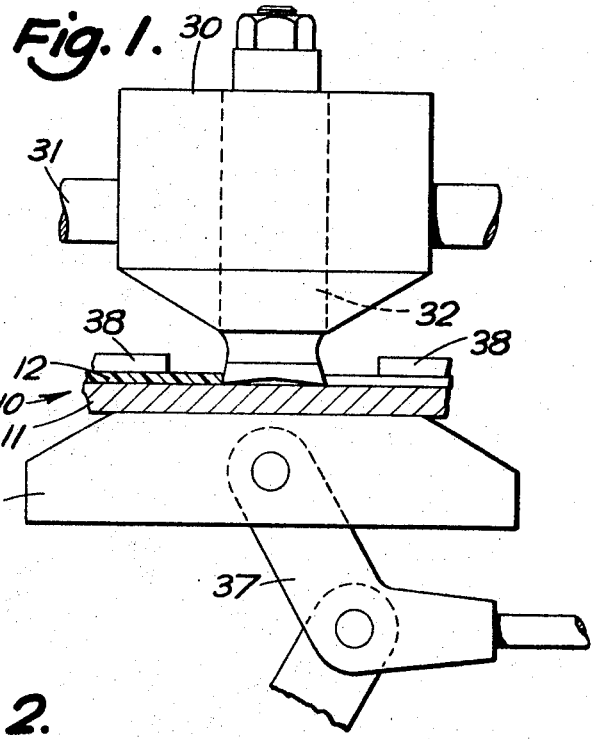
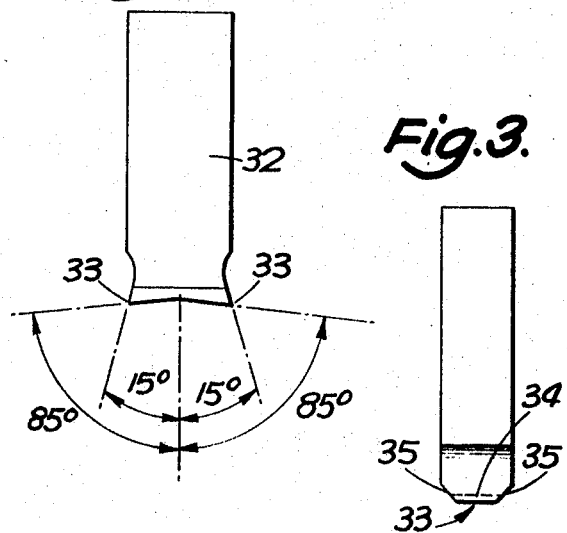
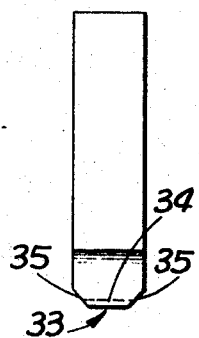
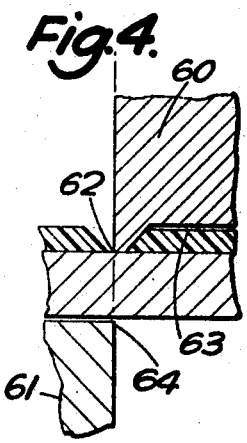

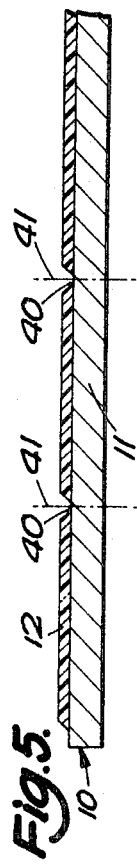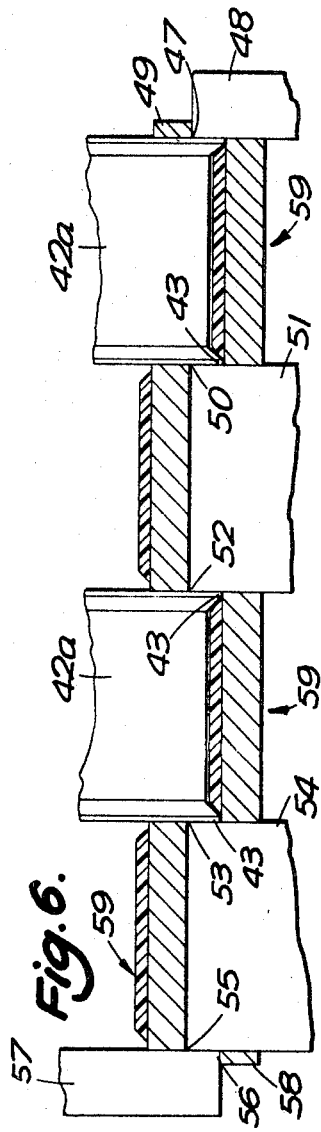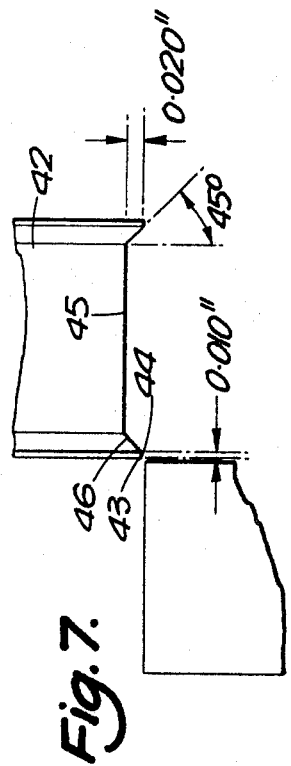

METHODS OF CUTTING LAMINATED STRIP MATERIAL

This invention relates to methods of cutting through laminated strips of material of the type comprising two adjacent layers which are bonded to one another and in which one of the adjacent layers is relatively soft and the other of the adjacent layers is relatively hard. For example the laminated strip may comprise a steel or other metallic backing having a layer of polymeric material on one side thereof, although the invention is not restricted to strips having two layers and could be used for strips having three or more layers.

The invention provides a method of cutting a laminated strip material of the type defined comprising a first cutting operation which forms a groove in the soft layer of material which groove extends up to the interface with the harder layer and a second cutting operation in the harder layer in a plane located between the sides of the groove in the soft layer, the width of which groove is such that distortion of the harder layer due to the second cutting operation does not reach the interfaces between the soft layer and the harder layer on either side of the groove.

The second cutting operation may be carried out by co-operating shearing members which engage the harder layer on either side thereof without engaging the softer layer.

The groove formed in the softer layer may taper towards the bottom layer at the interface with the harder layer.

The walls of the groove may be formed so that they are inclined at substantially 45° to the interface with the harder layer.

Grooves may be cut in the softer layer successively at a number of spaced locations and the cuts may be completed by cutting the harder layer at said locations simultaneously.

The invention also provides an apparatus for carrying out any of the methods referred to above in which a groove is formed in the soft layer of the material comprising a tool having a cutting edge for forming a groove, means for moving the tool relatively to the strip to form a groove at the required location and co-operating shearing members for engaging the face of the harder layer within the groove and the opposite side of the harder layer to shear through the layer in a plane located centrally between the sides of the groove.

In the case where the harder layer is required to be cut simultaneously at at least two locations, one shearing member may be provided having two projections which enter the grooves formed in the soft layer on the strip each of which projections may have a shearing edge, the member having a recess between the projections for accommodating the part of the soft layer of material between the locations of the two cuts and two spaced shearing members for engaging the other side of the strip.

The shearing members may comprise rollers formed with said projections and shearing edges between which the strip is fed.

The following is a description of one embodiment of the invention reference being made to the accompanying diagrammatic drawings in which:

FIG. 1 is a diagrammatic view of an apparatus for cutting an upper layer of a laminated strip;

FIG. 2 is a side elevation view of a tool used in the apparatus of FIG. 1;

FIG. 3 is an end elevation view of the tool shown in FIG. 2;

FIG. 4 is a sectional view of an apparatus for completing the cutting of the strip;

FIG. 5 is a transverse sectional view of a laminated strip which is partially severed in directions along its length;

FIG. 6 is a view of an apparatus for completing the longitudinal severing of the strip shown in FIG. 5; and FIG. 7 is a detailed view of part of the apparatus shown in FIG. 6.

Referring firstly to FIG. 1 of the drawings there is shown a strip of laminated material indicated generally by the reference numeral 10 which comprises a hard metallic backing 11 having a thickness of 0.051 inches and a layer 12 of a soft polymeric material having a thickness of 0.009 inches bonded to the upper face of the backing element. The strip 10 is fed step by step to an apparatus which comprises a head 30 which is slidably mounted on horizontal rods 31. Mounted in the head 30 is a tool 32 the lower end of which projects below the head 30. The tool 32 which is shown in greater detail in FIGS. 2 and 3 of the drawings has cutting edges indicated at 33 at its lower end with a recess 32a between them. As shown in FIG. 2 each cutting edge consists of a central horizontal edge part 34 which is flanked by two edge parts 35 inclined upwardly at 45° to the horizontal portion.

The strip 10 which is fed by means not shown into the plane of the paper as viewed in FIG. 1 of the drawings rests on a supporting member 36 which is mounted on a mechanism indicated at 37 which raises and lowers the member 36. Edge portions of the upper face of the strip on either side of the location where the tool 30 is to operate engage under fixed plates 38 to which the strip 10 is clamped by raising of the member 36 after the strip has been advanced by the required amount. The head 30 is then traversed from right to left and the tool 30 cuts through the soft layer 12 of the strip. In so doing the edge part 34 of the leading cutting edge cuts the bond between the soft layer 12 and backing 11 and the inclined edge parts 35 cut inclined walls in the soft layer 12 to form a groove in the soft layer 12. The mechanism 37 is then operated to release the strip for a further advance after which the head 30 crosses the strip in the opposite direction.

The grooved strip is then passed to a shearing apparatus illustrated in FIG. 4. The shearing apparatus upper and lower shearing members 50 and 61 respectively. The upper shearing member 60 extends across the width of the strip 10 and is reciprocated in a vertical direction by means (not shown). The shearing member 60 has a cutting edge 62 at the lower end thereof and a recess 63 is formed in the lower end of the member adjacent the edge 62 to provide clearance over the soft layer of the strip. The lower shearing member 61 has a shearing edge 64 and is arranged so that as the member 60 is moved downwardly the two edges 62, 64 co-operate to shear through the backing 11.

The strip is positioned so that the backing is sheared along the center line of the groove formed in the soft layer 12 and the width of the groove is such that distortion of upper part of the backing does not extend to the bond between the layers 11 and 12 of the strip on either side of the groove.

Referring now to FIG. 5 of the drawings there is shown a transverse cross-section of a laminated strip 10 in the upper layer 12 of which longitudinal grooves 40 have been formed. The grooves 40 are formed by similar tools to the tool 32 of the apparatus shown in FIG. 3. The width of the base of the groove is such that the harder material can be sheared along planes indicated at 41 located centrally with respect to the groove without the deformation caused by the shearing operations spreading to parts of the harder layer which are bonded to the layer 12 on either side of the groove. In this case the width of the base of the groove is 0.040 inches. The sidewalls of the grooves 40 are inclined at 45° to the base of the groove.

FIG. 6 shows an apparatus into which the strip of FIG. 4 is fed to shear the backing layer of the strip. The apparatus comprises a number of overlapping upper and lower rollers between which the strip is fed. The upper rollers are spaced apart on a common motor-driven drive shaft (not shown) and the lower rollers are spaced apart on a further common motor-driven drive shaft (not shown). The upper rollers comprise two rollers 42, 42a each of which has peripheral cutting edges 43. As best seen in FIG. 9 of the drawings a flat 44 is formed around the outer surface of the roller adjacent each cutting edge 43 and between the two flats 44 the roller has a recess 45. The sidewalls 46 of the recess are inclined at approximately 45° to the bottom wall of the recess. The axial spacing of the two cutting edges 43 on the roller is identical to the spacing between planes 41 on the strip 10 where two adjacent cuts are required to be made. The width of the flats 44 in this case is 0.010 inches so that each flat engages only a part of the upper surface of the layer 11 within the groove and the inclined faces 46 are spaced from the adjacent inclined face of the groove. Likewise the depth of the recess 45 is such that the base of the recess is spaced from the upper surface of the layer 12. The right hand cutting edge 43 on the roller 42 co-operates with a cutting edge 47 formed around the left hand periphery of a lower roller 48. The cutting edges trim away an excess edge portion 49 of the strip. The left hand cutting edge 43 of the roller 42 co-operates with a cutting edge 50 formed around the right hand periphery of a lower plain roller 51 which has another cutting edge 52 around its left hand periphery which co-operates with the right hand cutting edge 43 on the left hand roller 42. The left hand cutting edge 43 on the roller 42a co-operates in turn with a cutting edge 33 formed at the left hand end of another lower plain roller 54 which has a cutting edge 55 at its left hand periphery which co-operates with the cutting edge 56 of an upper roller 57 which is similar to the roller 48 and trims away excess strip 58 at the left hand end of the strip. The strip is thus divided into four longitudinally extending strips 59 with two waste pieces 49 and 58. Each of the lengths 59 of strip is then divided transversely into portions from which half bearing liners are formed by the apparatus shown in FIGS. 1 to 3 described above.

I claim:

1. A method of cutting a laminated strip material of the type defined hereinbefore comprising a first cutting operation which forms a groove in the soft layer of material which groove extends up to the interface with the harder layer and a second cutting operation in the harder layer in a plane located between the sides of the groove in the soft layer, the width of which groove is such that distortion of the harder layer due to the second cutting operation does not reach the interfaces between the soft layer and the harder layer on either side of the groove.

2. A method as claimed in claim 1 wherein the second cutting operation is carried out by co-operating shearing members, which engage the harder layer on either side thereof without engaging the softer layer.

3. A method as claimed in claim 1 wherein the groove formed in the softer layer tapers towards the bottom layer at the interface with the harder layer.

4. A method as claimed in claim 3 wherein the walls of the groove are formed so that they are inclined at substantially 45° to the interface with the harder layer.

5. A method as claimed in claim 1 wherein grooves are cut in the softer layer successively at a number of spaced locations and the cuts are completed by cutting the harder layer at said locations simultaneously.

* * * * *